(12) United States Patent
Bu et al.

(10) Patent No.: US 8,966,270 B2
(45) Date of Patent: Feb. 24, 2015

(54) METHODS AND SYSTEMS FOR PROVIDING CONTROLLED ACCESS TO THE INTERNET

(75) Inventors: Tian Bu, Edison, NJ (US); Li Li, Edison, NJ (US); Ramachandran Ramjee, Summit, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 2520 days.

(21) Appl. No.: 11/647,274

(22) Filed: Dec. 29, 2006

(65) Prior Publication Data
US 2008/0159299 A1    Jul. 3, 2008

(51) Int. Cl.
H04L 9/32      (2006.01)
H04L 29/06     (2006.01)

(52) U.S. Cl.
CPC ............ *H04L 63/10* (2013.01); *H04L 63/101* (2013.01); *H04L 63/123* (2013.01)
USPC .......................................... 713/175; 713/176

(58) Field of Classification Search
None
See application file for complete search history.

(56) References Cited

U.S. PATENT DOCUMENTS

| | | | | |
|---|---|---|---|---|
| 6,408,336 | B1 * | 6/2002 | Schneider et al. | 709/229 |
| 6,615,350 | B1 * | 9/2003 | Schell et al. | 713/168 |
| 7,861,283 | B2 * | 12/2010 | Kobayashi | 726/2 |
| 2002/0157019 | A1 * | 10/2002 | Kadyk et al. | 713/201 |
| 2005/0033958 | A1 * | 2/2005 | Connell | 713/156 |
| 2006/0053290 | A1 * | 3/2006 | Randle et al. | 713/169 |
| 2007/0250582 | A1 * | 10/2007 | Sidhu et al. | 709/206 |

OTHER PUBLICATIONS

D.G. Andersen, *Mayday: Distributed filtering for Internet Services*, In Proc. of USITS, 2003.
T. Anderon et al., *Preventing Internet Denial-of-Service with Capabilities*, In Proc. of HotNets, Nov. 2003.
K. Argyraki et al., *Network Capabilities: The Good, the Bad and the Ugly*, In Proc. of HotNets, Nov. 2005.
J. Baek et al., *A Survey of Identity-Based Cryptography*, In AUUG, 2004.
H. Balakrishnan et al., *A Layered Naming Architecture for the Internet*, In Proc. of ACM SIGCOMM, pp. 343-352, 2004.
H. Balakrishnan et al., *Peering Peer-to-Peer Providers*, In Proc. of IPTPS, 2005.
H. Ballani et al., *Off by Default!*, HotNets'05, 2005.
P.S.L.M. Barreto et al., *Efficient and Provably-Secure Identity-Based Signatures and Signcryption from Bilinear Maps*, In Proc. of ASIACRYPT, pp. 515-532, London, UK, 2005.
D. Boneh et al., *Short Signatures from the Well Pairing*, In Proc. of ASIACRYPT, pp. 514-532, London, UK, 2001.
M. Castro et al., *Secure Routing for Structured Peer-to-Peer Overlay Networks*, SIGOPS Oper. Syst. Rev., 36(SI):299-314, 2002.
D. Clark, *Requirement for a Future Internet Security as a Case Study*, http://find.isi.edu/presentation_files/David_Clark-Security-Requirements-2-pdf, Dec. 2005.

(Continued)

*Primary Examiner* — Nadia Khoshnoodi
(74) *Attorney, Agent, or Firm* — Capitol Patents & Trademark Law Firm, PLLC

(57) ABSTRACT

Novel, Internet-related architectures, methods and devices are proposed that are based on a fundamentally different philosophy: hosts (e.g., source and destination nodes) are given the ability to specify their access control policies to the network they are a part of, and the network enforces these policies. The architecture proposed is mobility friendly to the ever increasing number of mobile hosts and is scalable as well.

12 Claims, 8 Drawing Sheets

(56) References Cited

OTHER PUBLICATIONS

A. Rao et al., *Load Balancing in Structured P2P Systems*, In Proc. of IPTPS, pp. 68-79, 2003.

P. Ferguson, *Network Ingress Filtering: Defeating Denial of Service Attacks Which Employ IP Source Address Spoofing*, RFC 2267, Jan. 1998.

Y.-C. Hu et al., *SPV: Secure Path Vector Routing for Securing BGP*, In Proc of ACM SIGCOMM, pp. 179-192, 2004.

S. Kent et al., *Secure Border Gateway Protocol*, IEEE JSAC, 18(4), 2000.

T. Kerins et al., *Hardware Accelerators for Pairing Based Cryptosystems*, In Proc. of IEE Information Security, pp. 47-56, 2005.

A. Keromytis et al., *SOS: Secure Overlay Services*, In Proc. of ACM SIGCOMM, pp. 61-72, Aug. 2002.

R. Mahajan et al., *Controlling High Bandwidth Aggregates in the Network*, ACM Computer Communication Review, 32(3):62-73, Jul. 2002.

K. Park et al., *On the Effectiveness of Route-Based Packet Filtering for Distributed DoS Attack Prevention in Power-Law Internets*, In Proc. ACM SIGCOMM, pp. 15-26, Aug. 2001.

V. Ramasubramanian et al., *Beehive: O(1) Lookup Performance for Power-Law Query Distributions in Peer-to-Peer Overlays*, In Proc. of NSDI, 2004.

A. Rowstorn et al., *Scalable, Decentralized Object Location and Routing for Large-Scale Peer-to-Peer Systems*, In IFIP/ACM Middleware 2001, Nov. 2001.

S. Savage et al., *Practical Network Support for IP Traceback*, In Proc. ACM SIGCOMM 2000, pp. 295-306, Aug. 2000.

A.C. Snoeren et al., *An End-to-End Approach to Host Mobility*, In Proc. of ACM MobiCom, pp. 155-166, 2000.

I. Stoica et al., *Internet Indirection Infrastructure*, In Proceedings of ACM SIGCOMM, pp. 73-86, 2002.

M. Walfish et al., *Untangling the Web from DNS*, In NSDI, 2004.

A. Yaar et al., *A Stateless Internet Flow Filter to Mitigate DDoS Flooding Attacks*, In Proc. of IEEE Symposium on Security and Privacy, 2004.

X. Yang et al., *A DoS-Limiting Network Architecture*, In Proc. of ACM SIGCOMM, pp. 241-252, 2005.

\* cited by examiner

- ACI's Certificate to S
- D's Certificate to ACI
- S's Certificate to D
- D's Certificate to S
- Payload

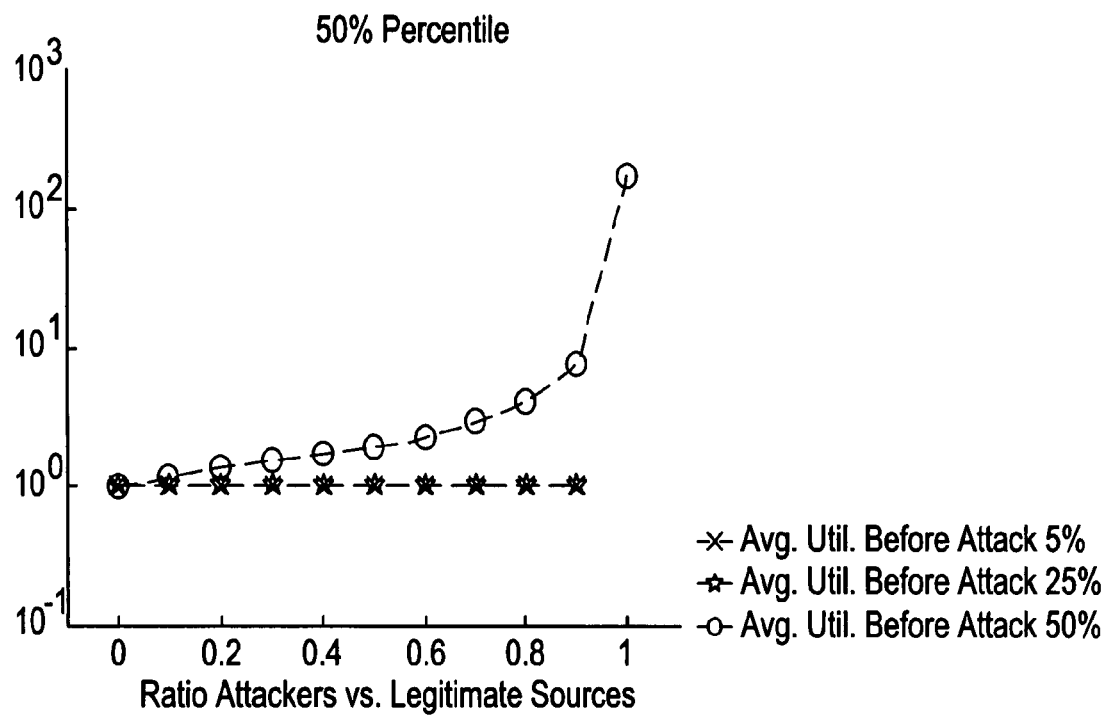
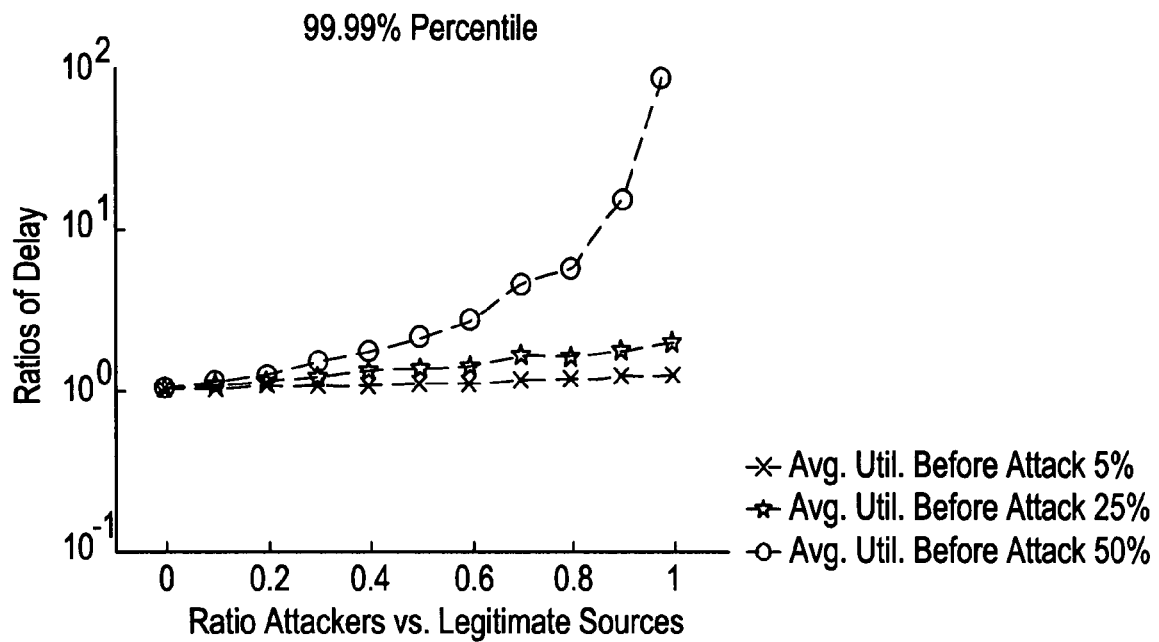

METHODS AND SYSTEMS FOR PROVIDING CONTROLLED ACCESS TO THE INTERNET

BACKGROUND OF THE INVENTION

The current open connectivity nature of the Internet has been plagued by security problems such as host compromise, Distributed Denial-of-Service (DDoS) attacks, worms, etc. . . . In order to tackle these vulnerabilities architectural modifications to networks have been proposed. Each of these proposals has their own drawbacks, however.

Two examples of such proposals are known as "filtering" and "capability" based solutions. A filtering-based solution satisfies some key design issues related to network vulnerability, such as network-based access control, pooling of resources and limited attack isolation, but not others, such as mobility friendliness and scalability. On the other hand, capability-based solutions such as Traffic Validation Architecture (TVA) satisfies the issues of attack isolation, scalability and limited network-based access control but not mobility friendliness or pooling of resources. Further, though TVA builds DDoS resiliency into the IP layer thereby narrowing the attack vulnerability window to a small fraction of the forwarding bandwidth, this still allows a DDoS attacker to arbitrarily delay access to legitimate sources.

Accordingly, it is desirable to provide solutions that make Internet based networks less vulnerable. Further, it is desirable to provide solutions that satisfy all of the key design issues related to network vulnerability (i.e., decreasing a network's vulnerability), namely, network-based access control, pooling of resources, attack isolation, mobility friendliness and scalability.

SUMMARY OF THE INVENTION

Recognizing the drawbacks of existing proposals, the inventors have discovered solutions that satisfy all of the key vulnerability related issues just discussed. Collectively, the solutions discovered by the inventors may be referred to as "ACACIA", which is an abbreviation of the words "A Certificate-based Access-Controlled Internet Architecture".

In accordance with embodiments of the present invention, in ACACIA a source node first obtains an access certificate from a desired destination node before it may send data packets to the destination node. To obtain such a certificate, the source node sends a request to the destination node along a signaling and control pathway ("control pathway" for short) that is separate from a data routing pathway ("data pathway" for short). The control pathway includes a DDoS-resilient access control infrastructure (ACI) consisting of Distributed Hash Table (DHT)-based servers in between the source and destination nodes. The DHT servers receive the request and determine whether to forward it on based on stored access control policies. In effect, by separating the ACI from the data pathway and using DHT-based servers, DDos attacks disguised as requests are isolated by the DHT servers close to their source. Further, the inventors discovered that DDoS resiliency (i.e., the ability to fend off attacks to many destinations) may be achieved in a cost-effective and scalable manner by using pooled, DHT servers operated by a third party service provider.

In accordance with further embodiments of the present invention, once the DHT servers validate a request it may be forward to the destination nodes via the control pathway. Upon receipt of a valid request, a destination node issues an access certificate to the source node via the data pathway. Thereafter, each time a source node wishes to send a data packet to the destination node via the data pathway it must include a valid access certificate. Otherwise, the packet may be dropped or given a lower priority. For example, a packet sent by a source node that includes a valid access certificate may be forwarded by a group of routers along the data pathway as a high priority packet to the destination node. Conversely, those packets that include invalid certificates may be dropped (i.e., the routers will decline to forward the packets). It should be noted that so-called legacy packets that include no certificate at all may be forwarded, but as low priority packets.

The ACACIA based solutions provided by the present invention are designed to be "mobility friendly" because the ability of a source node to send packets to a destination node (and vice versa) depends on the identity of the source and destination nodes, not on the location of such nodes.

BRIEF DESCRIPTION OF THE DRAWINGS

FIGS. 6 through 13 depict graphical results of measurements made by simulating an ACACIA architecture in accordance with embodiments of the present invention.

DETAILED DESCRIPTION OF THE INVENTION, WITH EXAMPLES

Before presenting a detailed description of the features and functions of the present invention (i.e., ACACIA-based methods and devices), we first present, in slightly more detail, a discussion of the key, vulnerability issues that the inventors sought to satisfy.

The inventors recognized that in order to solve the problems described earlier their proposed solution (e.g., architecture) should address the following vulnerability-related issues: (1) network-based access control; (2) pooling of resources; (3) attack isolation; (4) mobility friendliness; and (5) scalability.

By network-based access control is meant that a network should have the ability to store and enforce access control policies that are specified both pro-actively and reactively. By pooling resources is meant developing a shared solution/defense against DDoS attacks. Such a shared solution should be scalable and cost effective. As for the issue of attack isolation, any solution/architecture should isolate DDoS attacks as close to the source of an attack as possible in order to limit damage to the components of the architecture under attack and other components of the network.

With respect to mobility, the inventors believe that providing mobile devices with the ability to access a given network (e.g., send packets from a mobile source to a destination) making up the Internet in the future will be a dominate requirement for such a network. Thus, providing mobility friendliness is critical to the success of any proposed architecture as well. Said another way, any architecture/solution should provide a means/process for mobile nodes to maintain their ability to forward data packets to a destination while they are moving.

Finally, any proposed architecture/solution should be scalable such that it can operate even when a network includes billions of hosts with millions of access control policy specifications.

Keeping these issues in mind, the present inventors discovered and developed ACACIA.

Figure 1:
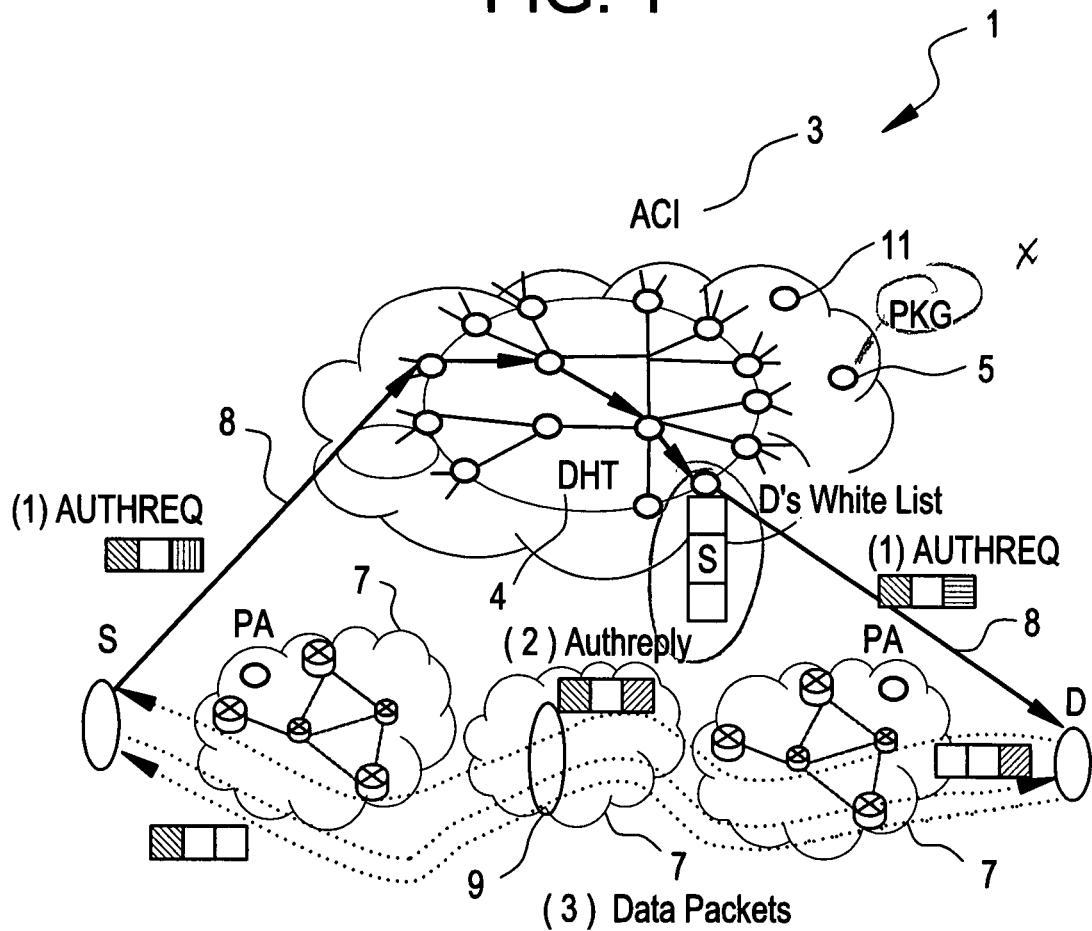
FIG. 1 depicts an example of a network that utilizes ACACIA according to embodiments of the present invention.

Referring now to FIG. 1, there is shown an example of a network 1 that consists of a source node, S, destination node, D, and an ACI 3 consisting of one or more DHT servers 4, among other components of network 1. FIG. 1 also depicts the signaling flows between the source node S and destination node D via pathways 8 and 9, respectively.

In accordance with an embodiment of the invention, source node S is operable to generate an authorization request message (AUTHREQ) and then forward the message to DHT servers or the like 4 making up the ACI 3 via signaling and control pathway 8. The DHT servers 4 act as intermediate control nodes to control the source' S access to the destination node, D (and other destination nodes as well). Though only a single source and destination node are shown in FIG. 1, it should be understood that the features, functions and processes of the present invention apply to a plurality of source and destination nodes as well. Because more than one pathway is discussed, for the sake of clarity pathway 8 may be referred to as the "first" pathway.

Continuing, in accordance with the present invention the source node S is operable to insert a source access certificate (SAC) in the payload of the message. When the message and its SAC are eventually received by the destination node D, the SAC will be used to authorize the destination node to send traffic (e.g., data packets) to the source node S. After the SAC is inserted into the AUTHREQ message, the source node S forwards the message to the intermediate nodes 4 making up the ACI 3.

In accordance with further embodiments of the invention, the nodes 4 (e.g., DHT servers) are operable to store and execute the destination node's D access control policy. That is to say, servers 4 are operable to determine whether or not destination node D has authorized source node S to send it data packets. In one embodiment of the invention, one or more of the servers 4 are operable to store so-called "access" and "denial" values that are a part of access and denial lists for each destination node, including node D. When the servers 4 receive an AUTHREQ message from the source node S the servers 4 are operable to compare the identity information corresponding to the source node in the message (e.g., in the SAC) to the stored access and denial values corresponding to destination node D. If the comparison indicates that the source node's identity matches a stored access value corresponding to node D, then the servers 4 forward the AUTHREQ message as a valid message on to the destination node D as a high priority request. If the source node's identity matches a denial value, then the servers 4 decline to forward the message and the message is subsequently dropped.

In yet a further embodiment of the invention, if the source's identity does not match either an access or denial value, the servers 4 are operable to forward the AUTHREQ message to the destination node D as a low priority, valid message. Further, so-called "off by-default" features may be implemented by using a denial list that includes a regular expression that indicates all nodes.

Upon receiving a valid AUTHREQ message, the destination nodes may be operable to construct and generate a destination access certificate (DAC) for the source node S. Thereafter, the destination node D is further operable to generate an AUTHREP message, insert the DAC into this message and forward the AUTHREP message directly to the source node S via data pathway 9, bypassing the ACI 3 because the destination node D does not need to obtain a valid SAC corresponding to the source node S to communicate to the source node S, one having been included in the AUTHREQ message received by the destination node D. For the sake of clarity this pathway 9 may be referred to as a "second" pathway. Pathway 9 is distinct from pathway 8. It should be understood that each time a source node wishes to communicate with a destination node, the source node must ask for, and receive, permission to do so by sending an AUTHREQ message and receiving an AUTHREP message. Further, each AUTHREP message is associated with an expiration time, after which it expires. In accordance with an embodiment of the invention, one or more of the routers 7 are operable to enforce the expiration times of an AUTHREP message.

Before continuing, some more details concerning the generation of the DAC may proof helpful to the reader. In accordance with the present invention, the inventors adopted the well-known principle of location and identity separation. Thus, each source and destination node (sometimes referred to as an "end point" or "host") has both an IP address as well as an opaque end point identifier (EID) (e.g., opaque bit string) associated with it. When a destination node issues a DAC it consists of two parts, a consent part and a binding part. The consent part allows the source node or EID to send packets to the destination node or FID, and the binding part binds the destination node or EID to a destination IP address. Thus, the ability of a source node or destination node to send data packets to one another is independent of the location of the source and destination nodes.

Once the destination node D has received a valid SAC and the source node S has received a valid DAC both the source and destination nodes may communicate freely by including the respective access certificates in any IP data packets they wish to send to one another. Routers or special purpose filtering boxes 7 along the data pathway between the source and destination nodes verify the authenticity of each certificate, preventing unauthorized sources from transmitting packets to hosts (e.g., destinations, sources).

In accordance with additional embodiments of the invention, each source node may store (i.e., be pre-provisioned with) access certificates that correspond to one or more DHT servers 4 in order to allow an AUTHREQ message sent from a source to be received by the servers 4 (see "bootstrapping" discussion below). This has an additional benefit of providing source authentication, thus mitigating many of the source spoofing attacks possible today. Finally, it should be noted that any signaling and data pathway protocols required to properly format AUTHREQ and/or AUTHREP messages and the like may be implemented transparently at the client with respect to legacy applications (see below for a more detailed discussion of this subject).

A network, like network 1, that utilizes an ACACIA architecture and related process/devices can be viewed as consisting of a control plane (i.e., the ACI) and a data plane that includes the routers 7 for verifying certificates. A key challenge faced by the inventors was to design a certificate that could be securely authenticated by routers in any administrative domain while also being mobility friendly and scalable. Realizing this, the inventors recognized the need to user asymmetric cryptography based on public and private keys as the basis for their design.

Accordingly, in accordance with further embodiments of the invention, an identity-based signature (IBS) scheme is employed because it lowers the cost and complexity of a public key infrastructure significantly. In IBS schemes, a node's identity (or its hash) serves as its public key while its private key is obtained from a trusted third party called a "private Key Generator" (PKG). A message is "signed" by an originator using its private key and the message is verified using the public keys of both the originator (i.e. its identity) and the trusted third party. One drawback of IBS-based schemes is that they have high computational overhead for verification. If mobility friendliness is not critical, mobility can be traded off for better verification performance by adopting a path-centric capability that uses an ACI for transporting capability requests and replies.

For now, however, we present solutions to address each of the challenges described earlier that satisfies all our design principles. We begin by discussing the ACI. The ACI, such as ACI 3 in FIG. 1, has two main functions. First, it has to provide each source node with a fair chance of ensuring delivery of AUTHREQ type messages to destination nodes, even in the presence of a large number of attack or malicious messages. Second, the ACI should control the delivery of a request directed to a given destination node using the policies specified by a given destination node (e.g., the access and denial values/lists discussed before).

In accordance with embodiments of the invention, one or more of the servers 4 within the ACI 3 maintains a record for each source or destination node. The record may contain a human readable identifier (HRI), EID, and access control policy associated with each node, for example. Each HRI corresponds to a given EID, the former being mapped to the later using a one-way hash function. For example, the HRI of CNN could be www.acacia.cnn.com As indicated above each server 4 makes use of distributed hash tables (DHTs). Thus, the record of a given node may be stored in one or more servers 4 (using multiple hash functions). In order to provide a source node with fair access, ACI 3 nodes 4 may maintain two queues: a per source queue for AUTHREQs that originate locally and a per-neighbor queue for AUTHREQs that are forwarded by neighbors of the ACI 3 nodes 4. Because the number of source nodes that can directly access an ACI node 4 is limited by configuration (see the "bootstrapping" discussion below), implementation of fair-sharing processes using the source queues is scalable.

Attacks on the ACI 3 may be aimed at specific nodes or specific objects (an object is the access control policy of an endpoint). The use of DHT based servers 4 or the like, however, removes any single point of failure because there is no hierarchical structure imposed. In the case of a node-based attack, the attack may be isolated by performing request processing on the node under attack, thereby minimizing the impact of the attack on rest of the servers 4 and the like within the ACI 3. This isolation is also important because it protects legitimate source nodes that use this node because these sources will be queued in a per-source queue and get their fair share. Otherwise, these sources have an even lower chance of being served. In the case of an object-based attack from diverse points aimed at the ACI 3 (indistinguishable from flash crowds), the present inventors discovered and developed a replication process ("replication" for short) that enables the pooling of entire ACI resources to service the request and protect the ultimate destination node. Thus, the combination of fair queueing, adaptive isolation and replication makes ACIs provided by the present invention DDoS resilient.

It should be noted that when the ACI 3 also stores the IP address of the destination EID, the ACI 3 supersedes the functionality of DNS. This has two main advantages: 1) the IP address of the destination is hidden from un-authorized nodes; and 2) vulnerabilities of the DNS to DDoS attacks no longer affect ACACIA. However, for initial deployment, it is also reasonable to keep DNS separate from the ACI 3. In this case, the ACI uses the DNS to resolve the destination endpoints HRI to an IP address before forwarding AUTHREQ messages to the destination nodes. Further, the reverse possibility, i.e. extending the current DNS system to incorporate the role of an ACI, is not attack resilient. This is because the hierarchical nature of the current DNS has many vulnerabilities. For example, any root of a subtree can be a single point of failure for all the descendant servers.

Using IBS, each node/host requires a PKG to provide it with private keys. In accordance with the present invention, the ACI 3 issues HRI, EID and the corresponding private key for each host/node. The specific entity within ACI that issues private keys for hosts is referred to as the aci-PKG, such as PKG 5 in FIG. 1. It should be noted that an aci-PKG only needs to issue keys during host/node sign-up and when keys need to be periodically changed. Thus, the aci-PKG is mostly off-line.

As mentioned above, each access certificate (e.g., DAC) contains two parts, consent and binding parts. Both are IBSs (sometimes referred to as "signatures"). In accordance with a further embodiment of the invention, the consent part may be generated by the destination node associated with each AUTHREQ. The destination node has a private key issued by the aci-PKG 5 while the destination EID is its public key. The consent signature includes the source EID, destination EID, and the public key (index) of the aci-PKG 5. When a data packet containing a DAC is received by a router 7, the router 7 is operable to verify this signature using the two public keys, the destination FID and the public-key of the aci-PKG 5.

The destination host/node by itself cannot generate the binding part of an access certificate. Otherwise, any attacker e.g., attack request) could impersonate the destination node by generating valid consent and binding parts to give the impression that they are located at a victim's IP address. Thus, the binding part must be signed by a trusted entity. In accordance with the present invention, the binding part may be generated by the entity that owns the destination address. This entity may be referred to as the Prefix Authority (PA). When the PA obtains its prefix address space, it is also issued a private key by the prefix Private Key Generator (pref-PKG) of the root authority of IP addresses, ICANN. The PA's public key is the prefix itself (its identity). This trust relationship is similar to the address PKI proposed by others. Thus, the binding signature includes the destination prefix, the public key (index) of the well-known public key of pref-PKG, destination EID and its IP address.

Upon receipt of a data packet that includes a DAC, a router 7 is operable to verify this signature using the two public keys, the destination prefix and the public key of pref-PKG. It should be noted that the binding part does not have to be generated for each AUTHREQ message. Instead, it may be refreshed periodically. Thus, the routers 7 only need the well-known and trusted public keys of the ACI provider and ICANN in order to verify the authenticity of an access certificate. If verification is successful, a router 7 will put the packet in a per-destination queue with high priority. If verification fails, the router will drop the packet.

Unlike existing capability-based systems which tie capability to a path, the methods and devices of the present invention decouple certificates from a path and IP source addresses. This means that the consent part of a certificate depends only on source/destination identities and thus, remains valid even when source/destination IP addresses change. An endpoint (e.g., source/destination) simply obtains a new binding part whenever its IP address changes and requests its correspondents to use this new binding part for subsequent communication to this IP address. In the case of a server serving millions of mobile hosts, the server only needs to use an updated access certificate (and IP address) provided by the source node to deliver packets to the source node at a new location. If both nodes move simultaneously, communication is re-established through the ACI 3. Thus, the present invention provides solutions that are fully compatible with other existing end-to-end mobility solutions. If Mobile IP is used as the mobility protocol, the devices and methods/processes of the present invention will support route optimization without requiring a new consent part. In sum, ACACIA is mobility friendly.

As mentioned above, a data packet is required to have a valid access certificate in order to use the high priority channel. Nodes obtain access certificates by sending signaling messages, such as an AUTHREQ message. The question remains: how do these signaling messages obtain their own access certificates so they are not rejected by the ACI 3?

First, consider a single-provider ACI service. Source and destination nodes that are customers of this service are authenticated and configured with access certificates in order to communicate using the high priority channel (or at a high priority level of some kind) with a pre-specified number of nodes in the ACI. Therefore, we only need to ensure that nodes of the ACI provider can obtain access certificates to each other. However, this must be achieved dynamically when the ACI nodes run a distributed protocol implementing DHT.

In order to prevent malicious nodes from joining the ACI, the present invention provides nodes in the ACI that can verify the authenticity of other nodes in ACI. We use an IBS scheme inside the ACI for this purpose. In accordance with yet further embodiments of the present invention, each ACI has an aci-control-PKG 11 (see FIG. 1) that is operable to issue private keys to each of the ACI nodes. This enables the ACI nodes to sign messages and be verified by other ACI nodes (this is similar to, but still distinct from, known certifying authorities).

For example, consider a situation where an ACI is already operational (nodes have valid certificates to their neighbors) and one of the nodes wants to add a new neighbor. The node simply routes a ACIAUTHREQ message over the already established DHT overlay using a high priority channel. The ACIAUTHREQ includes the nodes identity, a certificate for the new neighbor to access this node and a signature. The destination verifies the signature using the public key of the aci-control-PKG and the public key of the node (i.e., its identity). Once verified, the destination replies with a ACI-AUTHREP containing a certificate for the source. This is sent directly to the source in a high priority channel using the access certificate in the ACIAUTHREQ. Thus, normal DHT operations can continue using high priority without being subjected to attacks. When a new ACI node is introduced, new neighbors can be discovered and access certificates can be obtained using low priority channels as the time to obtain certificates is no longer critical.

In a multi-provider environment, each ACI of a provider maintains its own key space. Most have arrangements with one another to store pointers to objects hosted by other providers (thus, policy enforcement for a destination server is only performed by a particular provider). Certificates for inter-provider communication are pre-configured, similar to how BGP peering is established between ISPs today.

Changing "gears" somewhat, we now present a discussion of protocols and processes used in the inventions and a description of the processes used for load-adaptive replication in an ACI.

In accordance with the present invention, two protocols are provided: a control protocol described above that uses messages to obtain access certificates and a data plane protocol that is used by IP data packets to carry access certificates. In accordance with the present invention, both protocols can be implemented transparently to legacy applications by capturing the Domain Name Service (DNS) interactions and substituting them with AUTHREQ/AUTHREP messages and adding/removing a shim header with the appropriate access certificate into each outgoing/incoming IP data packet. We turn now to a discussion of some of the details of the data plane protocol and discuss router functions for processing data packets.

Figure 2:
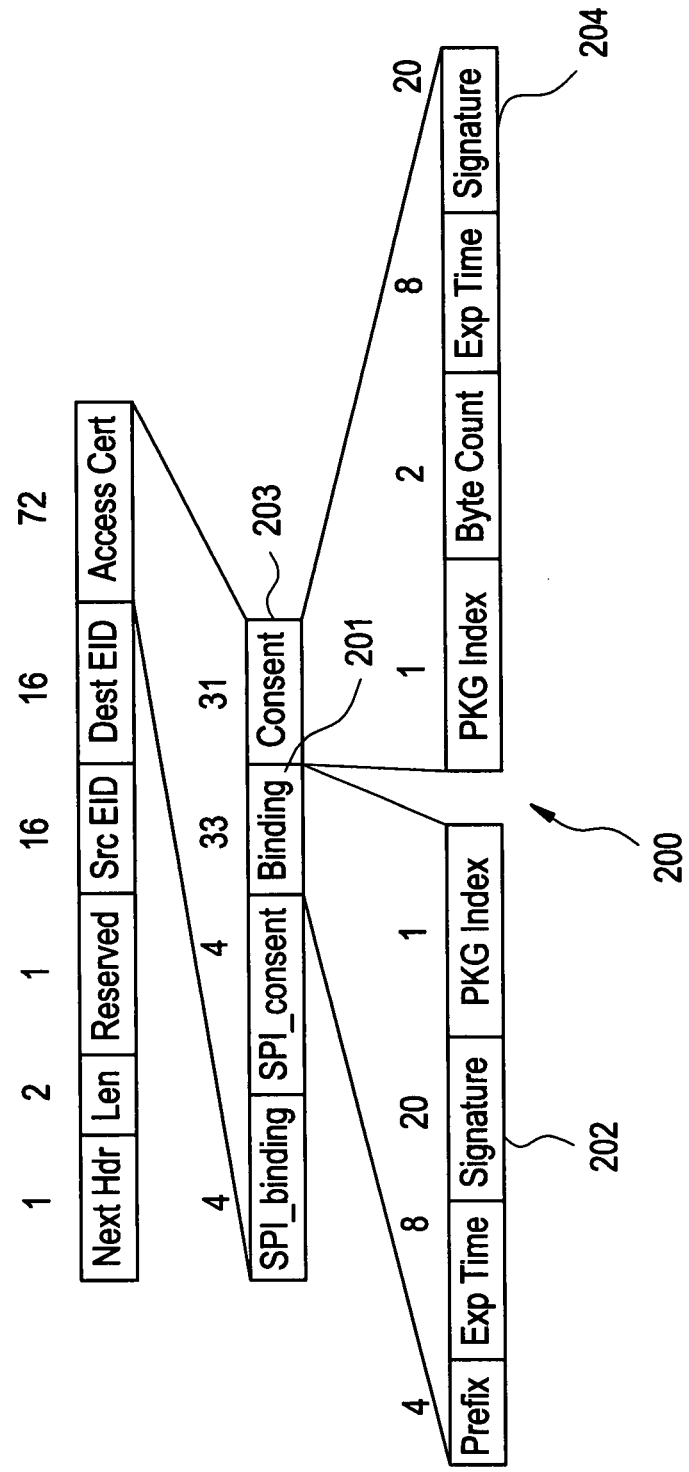
FIG. 2 depicts an example of an ACACIA shim header according to an embodiment of the present invention.

For purposes of the following discussion a source of a data packet is denoted as u, a destination as v, a destination ACI provider as i, and prefix owner as a. Each has its own public/private key pair (PK, SK). The PK is the same as the EID. In accordance with embodiments of the present invention, other than legacy traffic, all packets carry an ACACIA shim header 200, such as the one shown in FIG. 2, that extends the behavior of IP. That is to say, the protocol id field in IP is set to ACACIA. A router detecting an ACACIA protocol type may begin to process the ACACIA header 200 shown in FIG. 2. In one embodiment of the invention, the beginning of the header identifies the next header field (corresponding to the transport protocol such as TCP), and a length field. This is then followed by the EID of the source and destination and the access certificate. The certificate includes two security parameter index (SPI) values denoting the crypto algorithm and parameters used in the binding and the consent parts/portions respectively. Binding part (201) Bv is made up of destination prefix, destination prefix-PKG's index, expiration time (the time that the binding stops being valid) and a signature (202) Sa. The signature 202 certifies the destination EID: EIDv, destination IP address: IPv, and expiration time: ta, using the prefix private key SKa.

$$Sa = Sign_{SKa}(EIDv, IPv, ta)$$

Note that, the IP address is not duplicated in the binding part or the shim header. The consent (203) Cv consists of the aci-PKG index, the expiration time: tv, bytes allocated to sender: N, and a signature (204) Sv that certifies source EID: EIDu and destination EID: EIDu, expiration time (the time that the consent stops being valid): tv using the destination's private key SKv.

$$Sv = Sign_{SKv}(EIDu, EIDv, tv, N)$$

Borrowing the host identifier tag from the Host Identity Protocol, EIDs may be 16 bytes long. The expiration time is encoded using the Network Time Protocol (NTP)'s timestamp format which is typically 8 bytes long. The signatures are typically 20 bytes long. Thus the binding and consent parts taken together are typically 68 bytes long and the full ACACIA header may be typically 104 bytes. This compares reasonably with a 8-byte capability per router-hop (e.g. 80 bytes per packet for a 10-hop path) used in TVA. In an alternative embodiment of the present invention, packets used by the present invention need not include the identity and address separation (i.e., we use IP addresses also as identities). Thus, the header size generated by the present invention may be reduced to 40 bytes (including a 20-byte signature) because the binding part and EIDs are no longer necessary. This overhead is comparable to an IPSEC Authentication Header size of 24 bytes that includes a 12-byte message authenticate code. Finally, standard header compression techniques for long flows may also be adopted to further optimize header overhead if necessary.

In accordance with embodiments of the present invention, each router 7 may be operable to maintain two queues: a high priority queue and low priority queue. Routers at the edge (e.g., the routers closest to the source and destination nodes) are operable to maintain a per-destination high priority queue and a flow state cache as well; the later being used for fine-grained, fair queuing which prevents a source node with an access certificate from overwhelming a destination node in a short period of time. The flow state cache may also be used to cache verification results. The flow state cache design may be similar to ones used in TVA.

When receiving a packet, if the packet protocol ID is not ACACIA-based, the packet is treated as a legacy packet which is processed in the low priority queue. Otherwise, if a router finds an existing entry in its flow state cache, it then checks whether the allowed byte count has not exceeded and the certificate time has not expired. If the checks pass, it then checks whether the access certificate is the same as the cached one. If yes and the access certificate has been verified earlier, then the router fair queues the packet in the high priority predestination queue. If the flow state cache does not have an entry, then it will create an entry and initialize the allowed byte count and expiration time fields. The router then finds the public key PKprg of the pref-PKG using the PKG index in the binding. It then uses PKprg and the prefix to verify the binding signature. The router then uses the aci-PKG of the destination (found using the PKG index) and the destination EID to verify the consent signature. If the binding and consent are both valid, the packet will be processed in a per-destination high priority queue. If any check fails, then the packet will be dropped.

Note that we assume that the router verifying the access certificate has weak global clock synchronization on the order of few seconds. This is easily achievable if the routers run a protocol such as network time protocol (NTP).

The ACI infrastructure must (1) pool resources to fend off DDoS attacks and (2) isolate the impact of an attack from influencing other entities, while providing legitimate sources fair share of being serviced by the ACI. Note that, load balancing mechanisms for DHT in the literature support pooling of resources with the objective of serving maximal number of requests. However, these do not have the attack isolation property which is critical for a DDoS resilient ACI. As far as the present inventors know, theirs is the first DHT-based process that balances the inherent tradeoff between load balancing and attack isolation—we use attack isolation to protect legitimate sources and load balancing to protect destinations through the pooling of ACI resources.

Attack isolation is achieved as follows. When the object threshold is exceeded (i.e. potential local attack), then object O is replicated to this ACI node. Further, the node does not forward any of its local requests for this object (it continues to forward remote requests). Since a legitimate local source will be fair-queued with the attack traffic, it gets its fair share of being served (if local requests are forwarded, then the legitimate source gets an even lower chance of being served see the queueing analysis in the next section).

Load balancing is achieved as follows. When the node threshold is exceeded, the node starts with the object with the maximal request rate to replicate. The replication process provided by the present invention minimizes the number of replicas needed while guaranteeing no node thresholds are exceeded (if it is possible to do so). Unlike existing processes, such as Beehive, we do not replicate to nodes which do not have any object requests passing through it. This is important for attack isolation.

The present invention provides a dynamic programming based recursive process.

Figure 3:
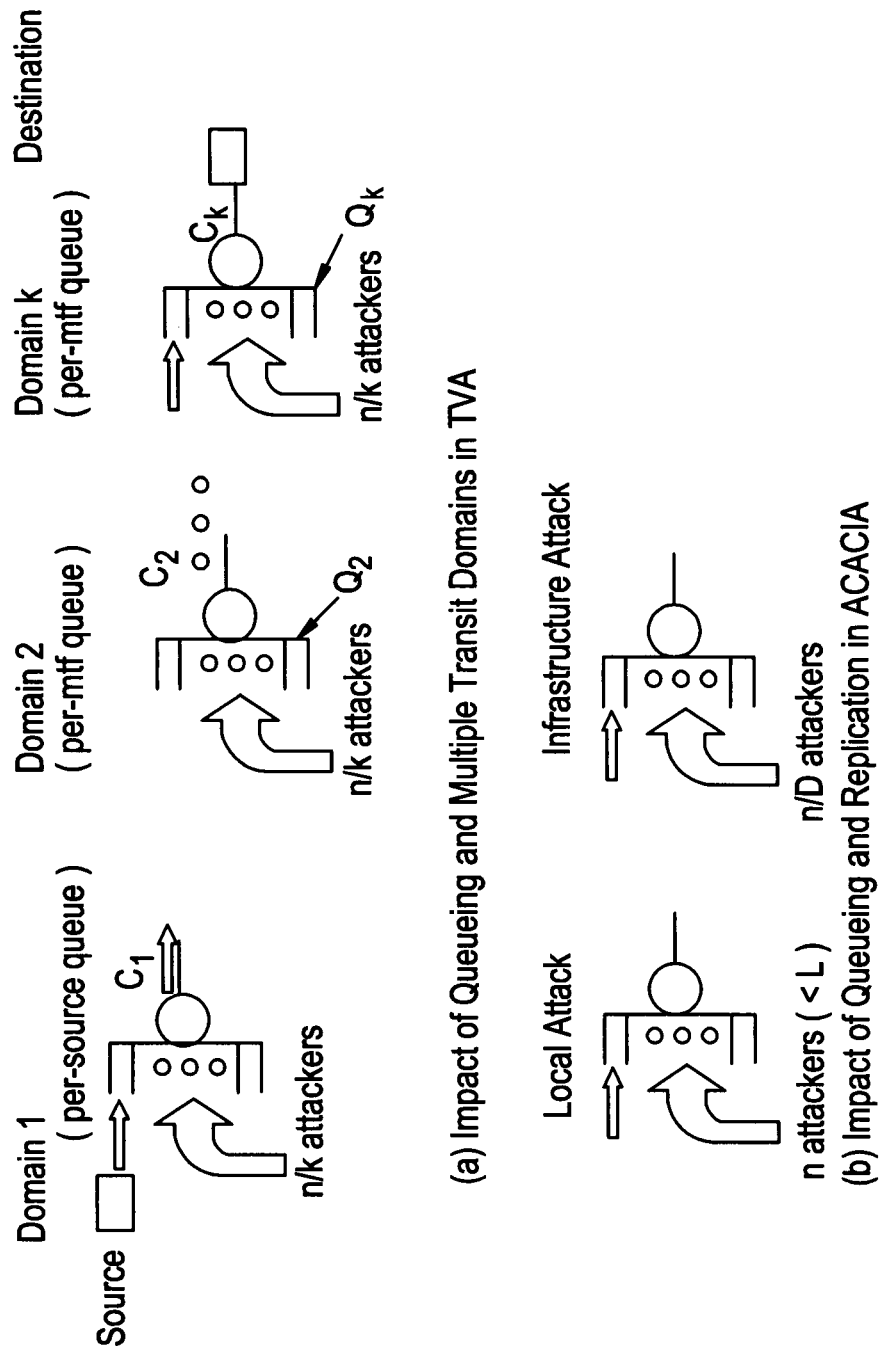
FIG. 3 depicts a simplified model comparing an ACACIA of the present invention with TVA.

The present inventors also evaluated the DDoS resiliency of their proposed ACI in ACACIA. Initially the inventors carried out an analytical comparison between of the ACI in ACACIA with TVA. Consider FIG. 3(a) where there are k domains along the path between a source and a destination. The number of queues and capacity of outgoing link in egress router of Domain i are Qi and Ci respectively. The n attackers are assumed to be uniformly distributed in the network such that there are n/k attackers joining the legitimate source at each domain along the path towards the destination. The attackers are evenly distributed in the other Qi−1 queues with at least one attacker per queue if n/k>>Qi, ∀i. We further assume that attackers always generate enough requests to keep their queues from being idle.

Let Bi denote the available bandwidth for the source after traversing through domains 1 to i. We assume that the legitimate source is fairly queued with other n/k attackers in the originating domain. Therefore we have B1=C11/(1+n/k)=C1k/(n+k). From here, Bi/Ci is the fraction of source traffic among all traffic domain i forwards to domain i+1. At most Ci+1/Qi+1 of this can be forwarded to the next domain since the egress link bandwidth is equally shared among all the Qi+1 queues. If Ci+1/Qi+1>Ci, then Bi+1=Bi since domain i is the bottleneck and can not even output enough traffic to obtain its fair share of bandwidth in domain i+1. Otherwise, we have Bi+1=(Bi/Ci)×(Ci+1/Qi+1). In the best case where ∀i, Ci>Ci+1/Qi+1, we have the available bandwidth along the entire path to be $$B_k = \frac{k}{n+k} \times \frac{C_k}{\prod_{i=2}^{k} Q_i} \quad (1)$$

where Ck is also the server capacity for processing capability requests.

In the case of ACACIA, an attacker can choose to attack an ACI node (referred to as local attack) or an ACI object (referred to as infrastructure attack). Let L be the maximum number of sources that are provisioned with access certificate to reach any ACI node. The attacker must first compromise n<L of these sources to launch a node attack. Since our replication algorithm isolates the attack source, the n attackers will simply share the capacity of the ACI node, Ci. Thus, available bandwidth is simply Ci/(n+1) for local attacks.

In the case of infrastructure attacks, the available bandwidth for ACACIA is also straightforward since a policy object will eventually be replicated to all ACI nodes by the replication algorithm as n becomes large. If we assume all n attackers are uniformly distributed and each originating ACI node performs per-source fair queuing, the available bandwidth for a legitimate source sending its request to ACI node i is $$\frac{D}{n+1} C_i \quad (2)$$

where D is the total number of ACI nodes and Ci is the capacity of ACI node i. We thus avoid the product term in the denominator of Equation 1 in ACACIA by actively replicating the access control policy at the originating ACI node and isolating the attack right there.

Figure 4:
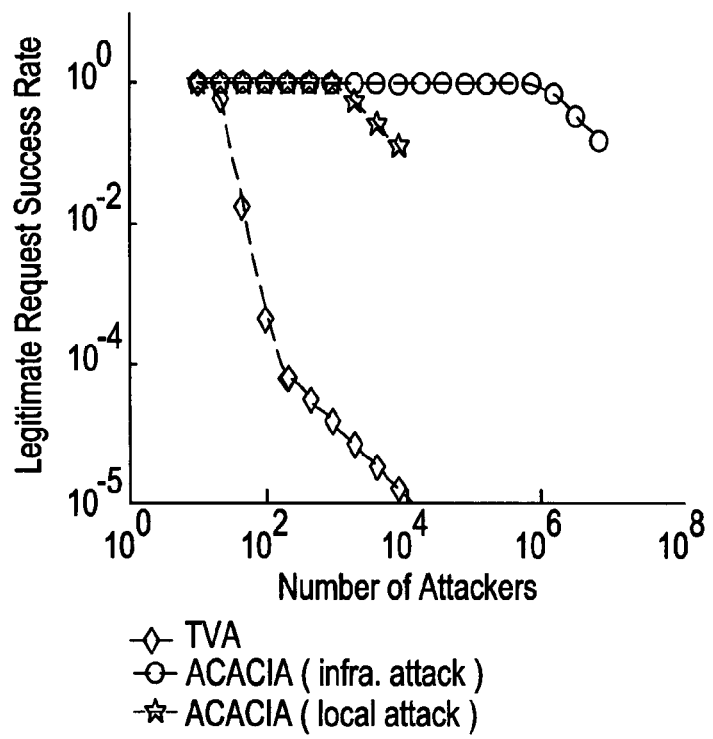
FIGS. 4 and 5 depict graphical comparisons of ACACIA and TVA.

FIG. 4 plots the fraction of successful requests versus the number of attackers in a log-log scale when the legitimate requests are sent once every second. We assume a TVA server and one ACI node have the same capacity of 1,000 requests/sec. In addition, we assume k=5, Qi=25, ∀i, and D=1024. We observe that the ACACIA is significantly more resilient to DDoS attacks. The success rate for TVA request starts to drop steeply before the number of attackers reach 100 (note that we assume attackers are uniformly distributed with respect to path identifiers which is the worst case for TVA). In the case of ACACIA, the success rate is maintained at 100% until the number of attackers reaches a thousand (million) for local (infrastructure) attacks and then decrease linearly as more attackers come in.

Figure 5:
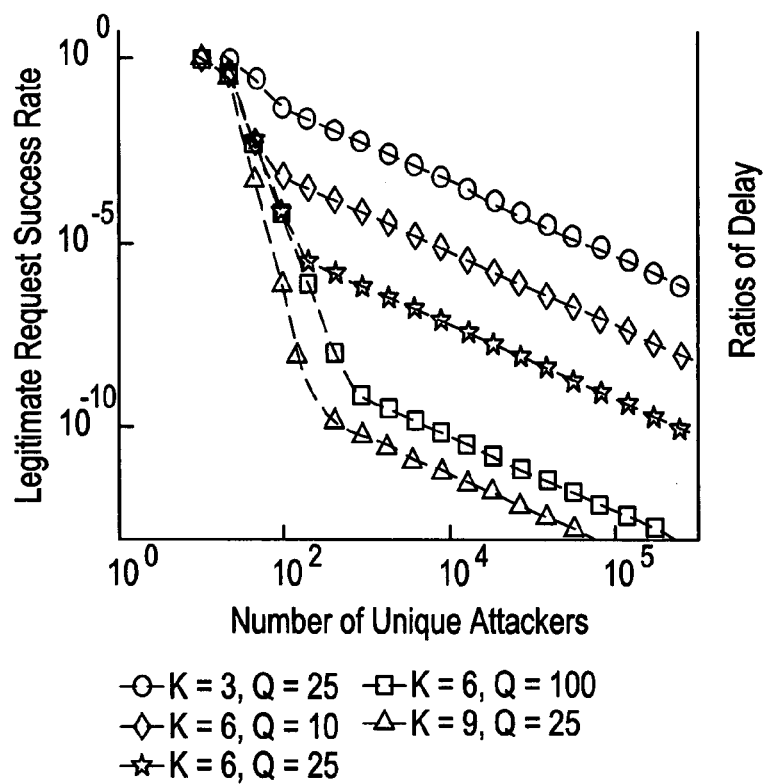

FIG. 5 shows that the success rate drops sharply as k, the number of domains between source and destination, and Q, the number of unique interfaces, increases This can be explained by Equation 1 where the success rate is inversely proportional to the product of k Q values.

After carrying the comparison with TVA the inventors also completed simulations driven by the traces collected from a campus network to examine the DDoS resiliency of ACACIA based on a number of factors, such as utilization, the origin of attacks, the distribution of victim, and the intensity of attack vary. For the sake of brevity, the inventors have not included a detailed discussion of the simulations herein. Such a discussion it should be added is not necessary for an understanding of the present invention and may, in fact, make it harder for the reader to understand the present invention. That said, the inventors have included a brief description and Figures which graphically depict the results of these simulations.

By way of background, the inventors simulated a Pastry network of 1024 using the earlier described replication process, where the base was set at 16 and the length of identifiers was set at 128. The inventors used the DNS traces collected from the campus network between Apr. 26 and May 9, 2004 for a total of 291 hours. The trace includes 3,693,728 domain name lookups with a total of 283,474 unique names. The lookup frequency of the trace follows an approximate Zipflike distribution with gradient of −1.078 on a log-log plot.

The inventors simulated attacks on three network configurations with the average utilization before an attack at 5%, 25%, and 50% respectively. The average utilization is defined as the ratio between the total request arrival rate during normal operation and the total capacity of all nodes; thus, this utilization represents the average load at each of the ACI nodes during normal operations.

FIGS. 6 and 7 plot the delay ratios using delays at 50% and 99.99% quantiles respectively. Focusing on the 99.99% quantile figure, when the attack requests increased from zero to one times the legitimate traffic load, the delay ratios increased for all three curves. However, the rates of increase are different; the higher the normal utilization level, the faster the increase as the number of attack requests increase. Note that these three curves demonstrate that ACACIA can support multiple ACI providers that provide different degrees of attack resilience—a government or enterprise customer may prefer an ACI that provides high degree of resilience while a consumer may be fine with an ACI that is provisioned at 50% utilization.

Figure 8:
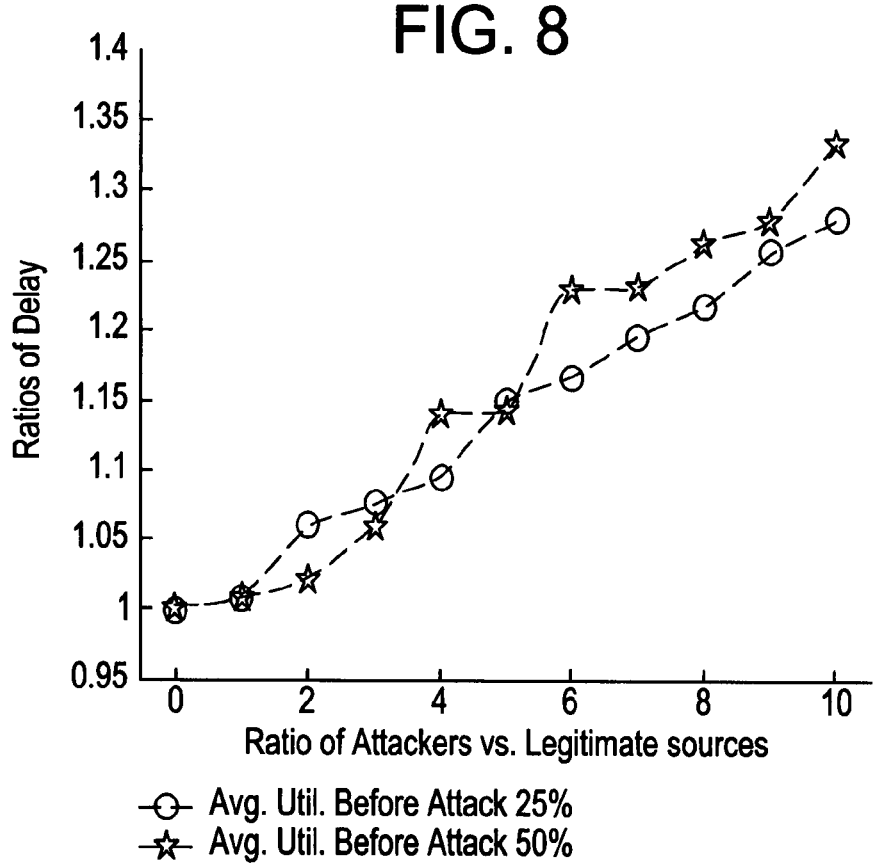

Infrastructure attacks may also target a particular object (e.g. webserver). The worst case is when the attack is targeted to the most popular object in the ACI. The inventors simulated this by increasing the number of attack requests for the most popular object from zero to ten times the normal amount. The inventors then simulated the attacks for an average utilization of 25% and 50% and plotted the delay ratios (see FIG. 8). In both cases, the increase in the delay ratio is not at all significant as the number of attack requests increases. This is because the victim object is replicated to more and more nodes as its popularity (attack intensity) grows and thus, the resources of the entire ACI can be pooled to handle large attacks on a single website.

Figure 9:
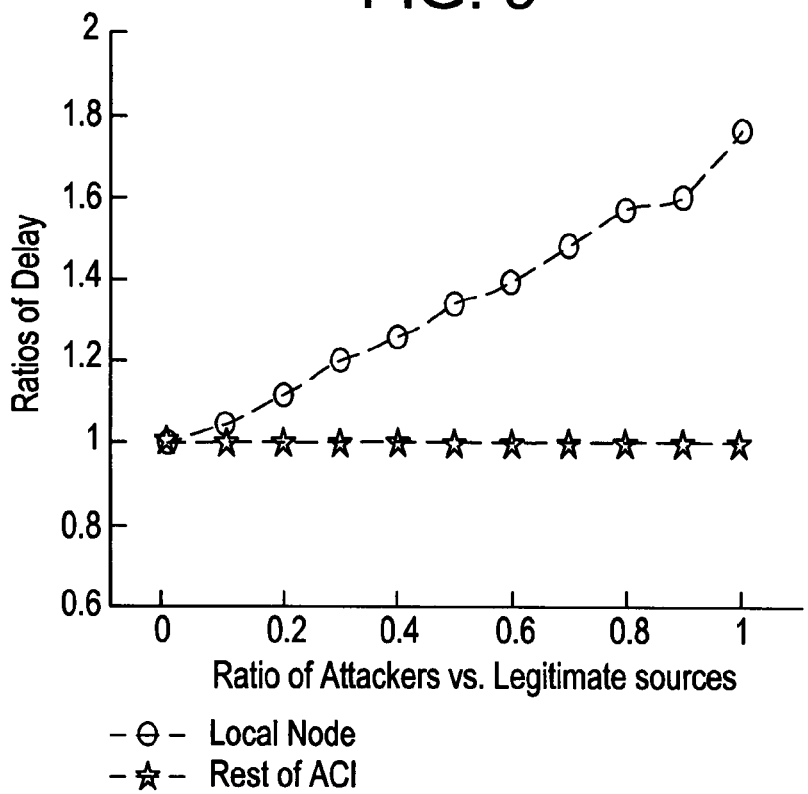

Attacks may also break out from a local area where all attack requests are aimed at the same ACI node. The worst case for a legitimate local source node is when the attack requests target the same object (otherwise, DHT routing would distribute most of the attack traffic along different paths away from the source node after the original node). The inventors simulated this and plotted its impact on both a local node and the rest of the network (see FIG. 9 and the delay ratios). Thanks to the inventive replication process that replicates the object to this node and then isolates the processing here, legitimate sources still have a reasonable chance of getting served. Further, isolating the attack results in no impact to the rest of the ACI.

Figure 10:
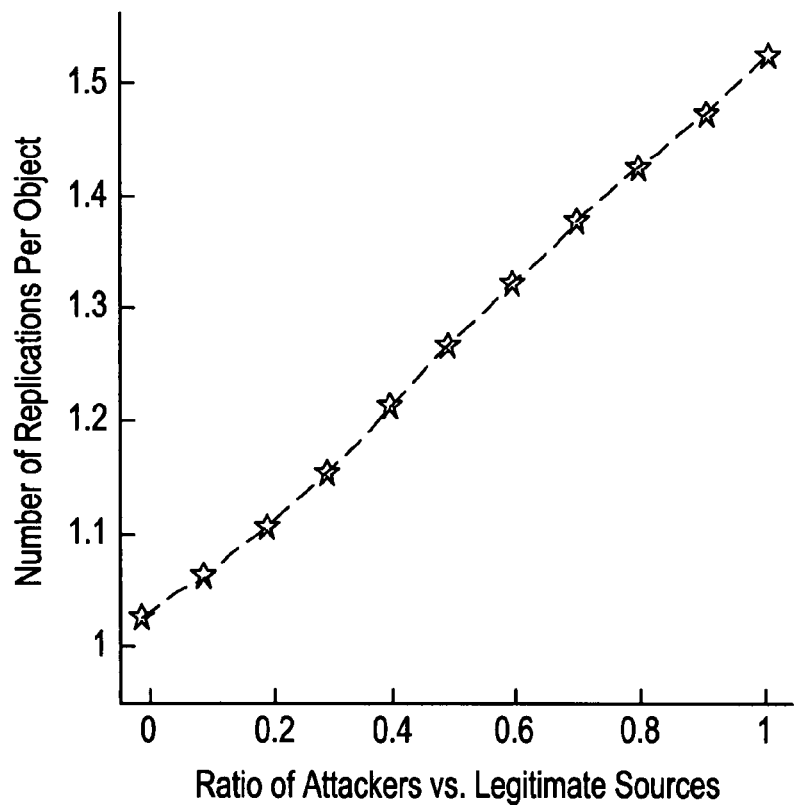
Figure 11:
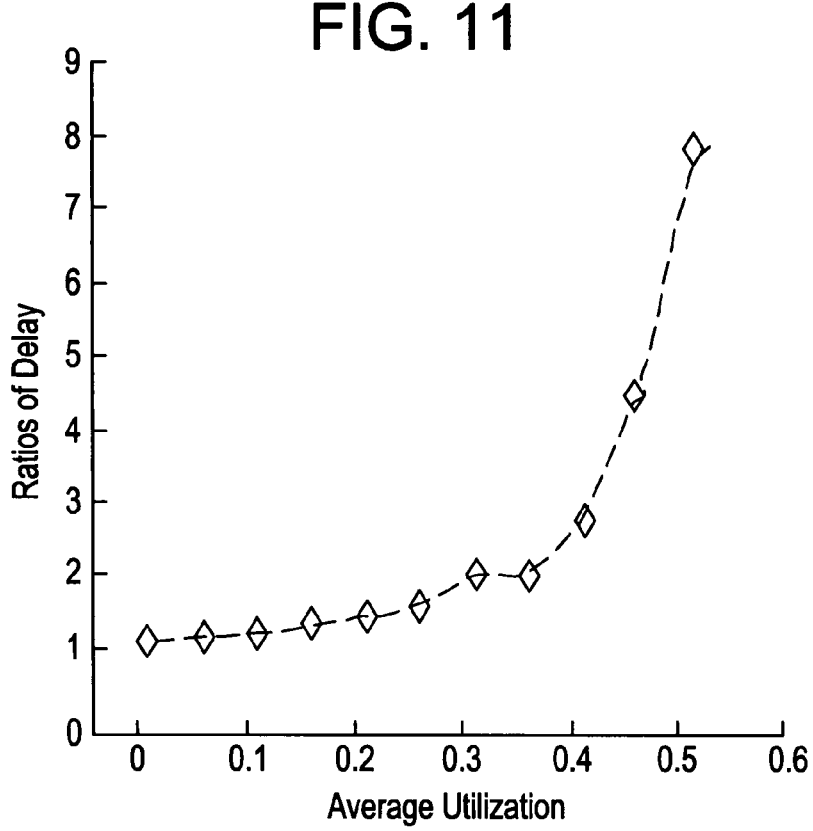
Figure 12:
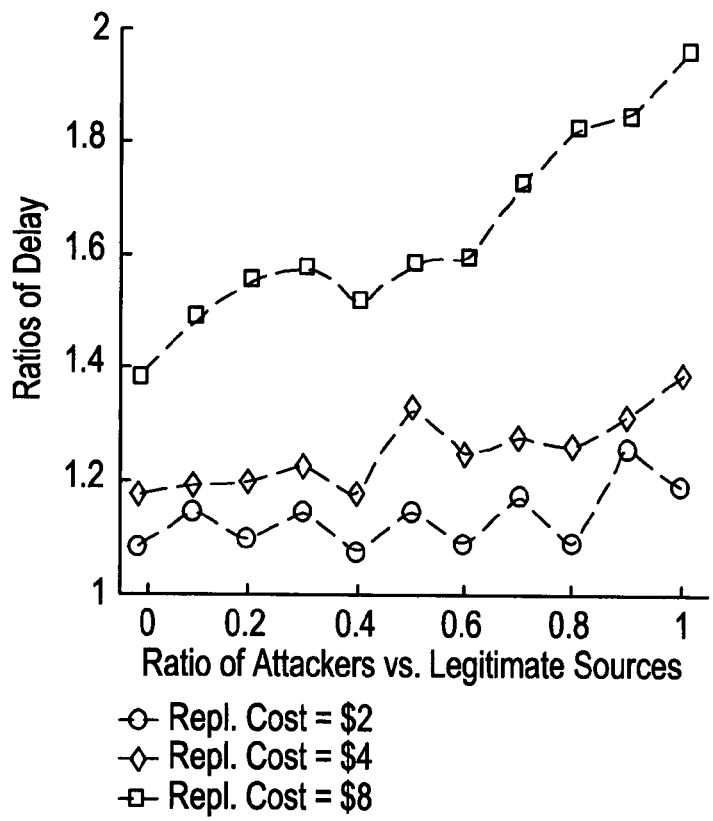
Figure 13:
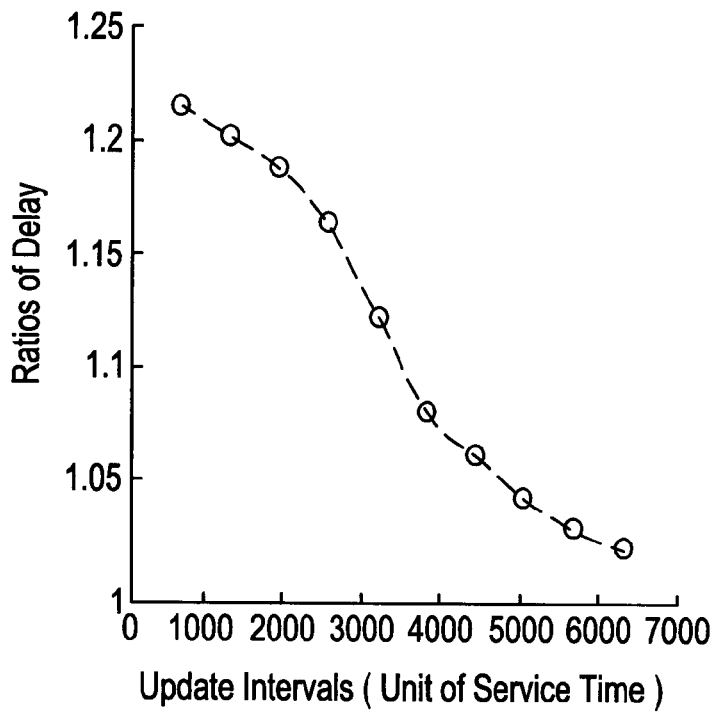

The inventors also investigated the impact of replication overhead and update overhead on access control policies using simulations. For the sake of brevity, however, a detailed discussion of these simulations has been omitted, it being noted that such a discussion is not necessary for an understanding of the present invention. That said, FIGS. 10 through 13 depict some of the results of these simulations where: FIG. 10 depicts a graph of replication ratios versus attack intensities; FIG. 11 depicts a graph of delay ratios versus average utilization; FIG. 12 depicts a graph of service slowdowns due to replication and FIG. 13 depicts service delays versus batch/update intervals.

For the sake of completeness we now present a discussion of verification performance, alternative designs and attack defenses.

Ideally each router 7 in FIG. 1 should be able to verify the authenticity of an access certificate at line speed. This requires fast signature verification algorithms. IBE-based cryptographic algorithms have been a very active area of research in the past few years. Consequently the performance of IBE-based crypto has been improving quite dramatically. For example, signature verification time has been reduced from seconds to milliseconds in the last few years. Signing requires point multiplication in an elliptic field, while verification also requires a pairing operation that is a few times more expensive. Pairing is very amenable to parallelization in hardware. Recent hardware implementations can perform a pairing operation in 0.7 milliseconds at a clock speed of 20 MHZ. With an ASIC operating at 1 GHz processor speed, verification can be done in about 30 microseconds. With a minimal ACACIA packet size of 168 bytes, this will provide a verification speed of about 40 Mbps. While 40 Mbps verification per chip is reasonable for initial deployment, it is believed to fall short based on the needs of the future Internet. On the other hand, the rate of progress in IBE-based research in recent years holds promise. In order to achieve faster verification today, verification has to be done in parallel, albeit at increased cost (e.g. if there are 10 security processors, then verification can be 10 times faster as packets can be queued independently). Further, pipelining may be used by letting routers 7 cooperate in the verification process where each router stamps intermediate results and a full verification is done at the egress of the domain. All these techniques can drive per-signature verification into sub micro seconds, improving verification speeds up to 10 Gbps per line-card.

While the discussion above has set forth some examples of an ACACIA architecture that uses access certificates, it should be understood that a capability based AACIA system may be used that includes only the ACI of ACACIA. Such as system will have the superior line-rate verification performance of a capability-based system and inherit the following features of ACI: 1) network-based access control 2) pooling of resources and 3) higher DDoS resiliency on the request channel. However, this system will no longer be mobility friendly because the capability is tied to the path.

The design of such a system can be achieved based on the known proposals. The ACI provider now also deploys verification points (VPs) in the domains of its customers. A source issues a capability request through the ACI. The ACI filters the request based on the destinations access control list. When/if the destination receives the request, the capability reply is sent back to the source through the ACI. The reply contains a token that is the last hash value of a one-way hash chain and a random sequence number. This token is installed into the source and destination domain VPs by the ACI. Thus, when the source includes this token in its packets, the VPs can verify them. The one-way hash chain enables the destination to renew the capabilities and the VPs to automatically verify the new capabilities without any signaling.

Finally, it should be understood that the discussion above only presents some of the ways and means that the ideas underlying the present invention may be implemented. Accordingly, it is the claims that follow that et forth the scope of the present invention.

We claim:

1. A method for controlling access to nodes in a network comprising:
   generating an authorization request message (AUTHREQ) that includes a source access certificate (SAC) for authorizing one or more destination nodes to send data packets to a source node;
   forwarding the (AUTHREQ) with its SAC to one or more intermediate control nodes via a first pathway, the pathway comprising a signaling and control pathway; and
   receiving a valid authorization reply message (AUTHREP) that includes a destination access certificate (DAC) that includes consent and binding, identity-based signatures from one of the one or more destination nodes via a second pathway that is distinct from the first pathway, wherein the (AUTHREP) authorizes the source node to send data packets to the destination node associated with the (AUTHREP).

2. The method as in claim 1 further comprising exchanging data packets between the source and destination nodes, wherein each data packet sent from the source node includes the DAC and each data packet sent from the destination node includes the SAC.

3. The method as in claim 2 further comprising verifying that each data packet sent from a node includes a valid access certificate.

4. The method as in claim 3 wherein the verification step comprises:
   verifying that a DAC of each data packet includes valid consent and binding, identity-based signatures.

5. A method for controlling access to nodes in a network comprising:
   receiving at least one valid authorization request message (AUTHREQ) that includes a source access certificate (SAC) from an intermediate control node via a first pathway, the SAC authorizing at least one destination node to send data packets to a source node associated with the SAC, and wherein the first pathway comprises a signaling and control pathway;
   generating an authorization reply message (AUTHREP) that includes a destination access certificate (DAC) that includes consent and binding, identity-based signatures; and
   forwarding the (AUTHREP) to the source node associated with the valid (AUTHREQ) via a second pathway that is distinct from the first pathway, the (AUTHREP) authorizing the source node to send data packets to the destination node.

6. The method as in claim 5 further comprising exchanging data packets between the source and destination nodes over the second pathway, wherein each data packet sent from the source node and destination node includes a valid access certificate.

7. A system for controlling access to nodes in a network, the system comprising:
   at least one hardware source node configured to:
      generate an authorization request message (AUTHREQ) that includes a source access certificate (SAC) for authorizing one or more destination nodes to send data packets to a hardware source node;
      forward the (AUTHREQ) with its SAC to one or more intermediate control nodes via a first pathway, the pathway comprising a signaling and control pathway; and
      receive a valid authorization reply message (AUTHREP) that includes a destination access certificate (DAC) that includes consent and binding, identity-based signatures from one of the one or more destination nodes via a second pathway that is distinct from the first pathway, wherein the (AUTHREP) authorizes the hardware source node to send data packets to the destination node associated with the (AUTHREP).

8. The system as in claim 7, further comprising at least one destination node, wherein the hardware source and the destination node exchange data packets, each data packet sent from the hardware source node includes a DAC and each data packet sent from the destination node includes an SAC.

9. The system as in claim 8 further comprising one or more routers operable to verify that each data packet sent from a node includes a valid access certificate.

10. The system as in claim 9 wherein the one or more routers is operable to verify that a DAC of each data packet includes valid consent and binding, identity-based signatures.

11. A system for controlling access to nodes in a network, the system comprising:
    at least one hardware destination node configured to:
    receive at least one valid authorization request message (AUTHREQ) that includes a source access certificate (SAC) from an intermediate control node via a first pathway, the SAC authorizing at least one hardware destination node to send data packets to a source node associated with the SAC, and wherein the first pathway comprises a signaling and control pathway;
    generate an authorization reply message (AUTHREP) that includes a destination access certificate DAC that includes consent and binding, identity-based signatures; and
    forward the (AUTHREP) to the source node associated with the valid (AUTHREQ) via a second pathway that is distinct from the first pathway, the (AUTHREP) authorizing the source node to send data packets to the hardware destination node.

12. The system as in claim 11, wherein the hardware destination node is further configured to exchange data packets with the source node over the second pathway, wherein each data packet sent from the source and the hardware destination node includes a valid access certificate.

* * * * *